R. C. AGNER.
COMBINATION TIRE HOLDER, LICENSE AND LAMP BRACKET.
APPLICATION FILED JAN. 10, 1917.
1,273,117.
Patented July 23, 1918.
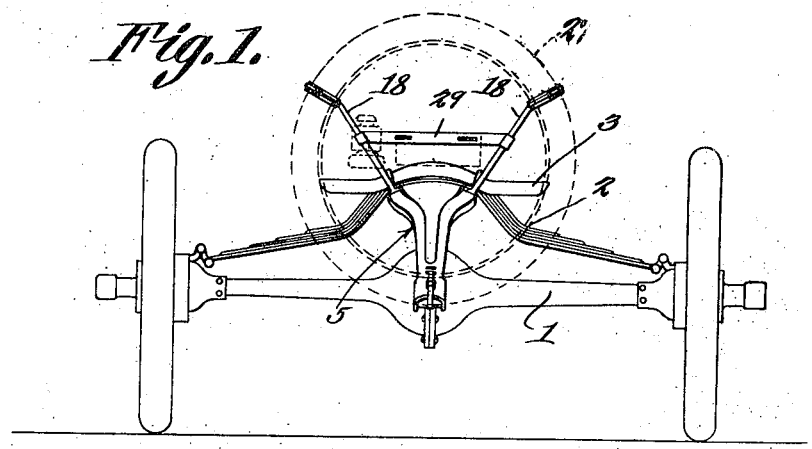
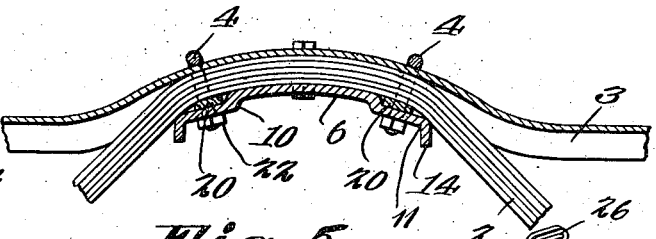
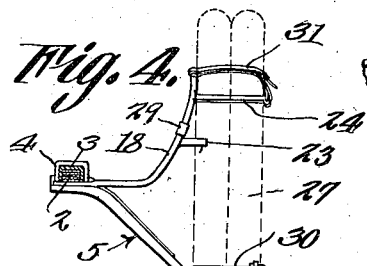
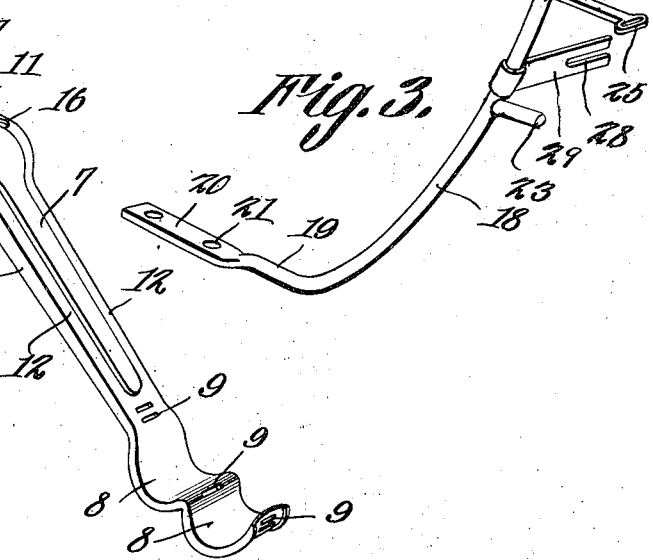
Witnesses
R. C. Agner, Inventor
Attorneys

UNITED STATES PATENT OFFICE.

RAYMOND C. AGNER, OF BURLINGTON, WISCONSIN.

COMBINATION TIRE-HOLDER LICENSE AND LAMP BRACKET.

1,273,117.

Specification of Letters Patent. Patented July 23, 1918.

Application filed January 10, 1917. Serial No. 141,645.

*To all whom it may concern:*

Be it known that I, RAYMOND C. AGNER, a citizen of the United States, residing at Burlington, in the county of Racine and State of Wisconsin, have invented a new and useful Combination Tire-Holder License and Lamp Bracket, of which the following is a specification.

The device forming the subject matter of this application is a lamp holder for an automobile, and one object of the invention is to provide a lamp holder which may be held in place by the clips which are used to attach the rear spring to the body support.

Another object of the invention is so to position the lamp holder and so to construct the same that it will prevent the clips from moving longitudinally of the spring.

Another object of the invention is so to construct the holder that parts thereof will act as plates through which the clips above mentioned pass.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in rear elevation, a portion of a motor-propelled vehicle to which the device forming the subject matter of this application has been attached;

Fig. 2 is a perspective showing the tire support;

Fig. 3 is a perspective showing an arm which coöperates with the tire support;

Fig. 4 is a section taken longitudinally of the vehicle, and showing the device forming the subject matter of this application in elevation;

Fig. 5 is a transverse section taken through the rear portion of the vehicle and showing parts of the device forming the subject matter of this application in the positions which they will assume with respect to the spring and the support which carries the vehicle body.

The numeral 1 indicates the rear axle of a motor-propelled vehicle, with which a rear spring 2 is assembled. The spring 2 is of upwardly arched form and carries a support 3 which upholds the vehicle body. Clips in the form of U-bolts, and denoted by the numeral 4, are used to connect the support 3 with the spring 2. The construction above outlined is a common one in vehicle construction. No novelty is claimed for the structure above described, saving in so far as it may enter into combination with parts hereinafter described.

The numeral 5 denotes generally a tire carrier which preferably is made of metal. The tire carrier 5 includes a body 6 and a downwardly prolonged extension 7, at the lower end of which, tire-receiving seats 8 are formed, the same having openings 9. The body 6 of the tire carrier 5 is curved transversely, to coöperate with the under edge of the spring 2. (See Fig. 5.) The body 6 of the tire carrier 5 is depressed as shown at 10 to form shoulders, and to fashion side members 11 which are prolonged as shown at 12 onto the extension 7. Along their longitudinal edges, the side members 11 are provided with depending reinforcing flanges 14 extended as shown at 15 onto the parts 12. The side members 11 are provided with openings 16 through which the U-bolts or clips 4 pass. The body 6 is provided with a central opening 17 adapted to receive the bolt (not shown) which, as is common connects the constituent parts of the spring 2.

The numeral 18 denotes a pair of arms having angular extensions 19 terminating in flattened heads 20 having openings 21. The heads 20 of the arms 18 lie between the side members 11 and the spring 2. The arms of the U-bolts 4 pass through the openings 21, the same being alined with the openings 16 of the tire carrier 5. Nuts 22 are threaded onto the lower ends of the U-bolts 4 and bear against the lower faces of the side members 11 of the tire carrier 5. One or both of the arms 18 may be equipped with projections 23 of any desired sort, adapted to receive a lamp (not shown). The arms 18 have rearwardly extended fingers 24 provided with openings 25. Openings 26 are formed in the upper ends of the arms 18. One or more tires 27 are mounted in the seats 8 and are held in place by straps 30 engaged in some or all of the openings 9. The tires pass above the fingers 24, and are held in place by straps or the like, shown at 31, and engaged in the openings 25 and 26. The arms 18 may be connected by a tie 29 adapted in any suitable manner, as indicated at 28, to receive a license tag (not shown).

Noting Fig. 5, it will be observed that the body 6 of the tire carrier 5 conforms closely to the curve of the spring 2 and acts as an important reinforcement therefor. It is to be noted, further, that the ordinary clips or U-bolts 4, found on a machine of this kind, are used for holding the tire carrier 5 in place. The heads 20 of the arms 18 act as retainers, through which the arms of the U-bolts pass, the heads 20 replacing the ordinary clip plates.

One difficulty in machines embodying the spring construction shown in Fig. 5, has arisen out of the fact that the clips 4 are prone to shift their positions longitudinally of the spring 2, notably if the driver habitually rides at one side of the vehicle. As a consequence, the vehicle body soon becomes lop-sided with respect to the running gear. In the present embodiment of the invention, the U-bolts or clips 4 cannot shift their positions longitudinally of the spring, because these clips or U-bolts are held apart by the parts 6 and 11 of the tire carrier 5, through which the clips pass. Owing to the offsetting of the tire carrier 5, shown at 11, the heads 20 of the arms 18 may be mounted as shown in Fig. 5, and may be made to replace the ordinary clip plates used in connection with the U-bolts 4.

The part 5 serves, either mediately or immediately to support the tire 27, to support a license tag, and to support a lamp. In claiming the invention, the part 5 will be referred to as an article holder, to avoid unnecessary limitations arising out of a specific enumeration of the particular object which is carried or supported by the part 5.

Having thus described the invention, what is claimed is:—

The combination with the rear spring of a vehicle, of a body support superposed on the spring; a rearwardly extended tire carrier including a central body bearing against the under side of the spring, and depressed members located on opposite sides of the body and spaced from the spring; tire supporting arms coöperating with the carrier and having their forward ends mounted on said members on opposite sides of the body and housed between the said members and the spring, and securing devices uniting the body support, the forward ends of the arms and the said members.

In testimony that I claim the foregoing as my own I have hereto affixed my signature in the presence of two witnesses.

RAYMOND C. AGNER.

Witnesses:
C. H. BEAUMONT,
HUGH AGNER.